(12) United States Patent
May et al.

(10) Patent No.: US 11,246,403 B2
(45) Date of Patent: Feb. 15, 2022

(54) TOOTHBRUSH SYSTEM

(71) Applicant: QUIP NYC INC., Brooklyn, NY (US)

(72) Inventors: William Thomas May, New York, NY (US); Simon Enever, Brooklyn, NY (US); William M. Sakran, Pelham, NY (US)

(73) Assignee: QUIP NYC INC., Brooklyn, NY (US)

( * ) Notice: Subject to any disclaimer, the term of this patent is extended or adjusted under 35 U.S.C. 154(b) by 71 days.

(21) Appl. No.: 16/263,802

(22) Filed: Jan. 31, 2019

(65) Prior Publication Data

US 2019/0231063 A1    Aug. 1, 2019

Related U.S. Application Data (60) Provisional application No. 62/624,433, filed on Jan. 31, 2018.

(51) Int. Cl.
*A46B 15/00* (2006.01)
*A61C 17/22* (2006.01)
(Continued)

(52) U.S. Cl.
CPC ...... *A46B 15/0006* (2013.01); *A46B 15/0044* (2013.01); *A61C 17/221* (2013.01);
(Continued)

(58) Field of Classification Search
CPC ............ A46B 15/0006; A46B 15/0044; A46B 15/004; A61C 17/221; A61C 17/3481;
(Continued)

(56) References Cited

U.S. PATENT DOCUMENTS

| 1,444,368 A | 2/1923 | Conley |
| 1,506,257 A | 8/1924 | Schmidt |
| (Continued) | | |

FOREIGN PATENT DOCUMENTS

| CN | 1523973 A | 8/2004 |
| CN | 1638702 A | 7/2005 |
| (Continued) | | |

OTHER PUBLICATIONS

PCT; International Search Report and Written Opinion; International Application No. PCT/US2019/015993; dated Sep. 7, 2019; 13 pages.
(Continued)

*Primary Examiner* — Shay Karls
(74) *Attorney, Agent, or Firm* — The Marbury Law Group, PLLC (57) ABSTRACT

A toothbrush apparatus and system and associated method. The apparatus includes a sensing module that performs at least one of the following: detect at least one time period associated with use of the toothbrush apparatus, detect one or more movements of the toothbrush apparatus, and any combination thereof. The apparatus's one or more processors communicatively coupled to the sensing module determine one or more measurements based on at least one of: the detected time periods, the detected movements, and any combination thereof, and store the determined measurements in one or more memory locations communicatively coupled to the processors. The apparatus also includes one or more feedback modules that receive the stored measurements and encode the measurements into corresponding feedback signals. One or more data transfer modules transmit the feedback signals.

7 Claims, 5 Drawing Sheets

(51) Int. Cl.
*A61C 17/34* (2006.01)
*B29L 31/42* (2006.01)

(52) U.S. Cl.
CPC ........ *A61C 17/3481* (2013.01); *A46B 15/004* (2013.01); *A61C 17/3418* (2013.01); *A61C 17/3445* (2013.01); *A61C 17/3472* (2013.01); *B29L 2031/425* (2013.01)

(58) Field of Classification Search
CPC ............ A61C 17/3418; A61C 17/3445; A61C 17/3472
See application file for complete search history.

(56) References Cited

U.S. PATENT DOCUMENTS

| | | |
|---|---|---|
| 1,899,242 A | 2/1933 | Alexander |
| 2,112,658 A | 3/1938 | Rathbun |
| 2,177,504 A | 10/1939 | Thompson |
| 2,227,541 A | 1/1941 | Groff |
| 2,278,365 A | 3/1942 | Daniels |
| 2,725,270 A | 11/1955 | Marvin |
| 3,088,148 A | 5/1963 | Michel |
| 3,181,189 A | 5/1965 | Isadore |
| 3,400,417 A | 9/1968 | Moret |
| 3,699,952 A | 10/1972 | Waters et al. |
| 3,977,743 A | 8/1976 | Harris |
| 4,070,735 A | 1/1978 | Canaday |
| 4,697,949 A | 10/1987 | Perez |
| 5,044,039 A | 9/1991 | Picard |
| 5,505,301 A | 4/1996 | Foley |
| 5,742,971 A | 4/1998 | Salinger |
| 5,779,046 A | 7/1998 | Plakos |
| 5,875,510 A | 3/1999 | Lamond et al. |
| 5,974,615 A | 11/1999 | Schwarz-Hartmann et al. |
| 6,015,328 A | 1/2000 | Glaser |
| 6,026,532 A | 2/2000 | Catanzaro |
| 6,049,936 A | 4/2000 | Holley |
| 6,076,223 A | 6/2000 | Dair et al. |
| 6,081,957 A | 7/2000 | Webb |
| 6,237,178 B1 | 5/2001 | Krammer et al. |
| 6,536,068 B1 | 3/2003 | Yang et al. |
| 6,731,213 B1 | 5/2004 | Smith |
| 6,779,216 B2 | 8/2004 | Davies et al. |
| 6,799,346 B2 | 10/2004 | Jeng et al. |
| 6,821,119 B2 | 11/2004 | Shortt et al. |
| 6,836,917 B2 | 1/2005 | Blaustein et al. |
| 6,895,625 B2 | 5/2005 | Lev et al. |
| 6,918,300 B2 | 7/2005 | Grez et al. |
| 7,207,080 B2 | 4/2007 | Hilscher et al. |
| 7,418,757 B2 | 9/2008 | Gatzemeyer et al. |
| 7,600,284 B2 | 10/2009 | Hui et al. |
| 7,636,977 B2 | 12/2009 | Banning |
| 7,757,327 B2 | 7/2010 | Filsouf |
| 7,812,481 B2 | 10/2010 | Iisaka et al. |
| 7,847,438 B2 | 12/2010 | Jin et al. |
| 7,917,986 B2 | 4/2011 | Jimenez et al. |
| 7,977,974 B2 | 7/2011 | Onishi et al. |
| 8,060,011 B2 | 11/2011 | Jin |
| 8,137,109 B2 | 3/2012 | Gatzemeyer et al. |
| 8,159,352 B2 | 4/2012 | Jimenez et al. |
| 8,175,840 B2 | 5/2012 | Hwang et al. |
| 8,204,531 B2 | 6/2012 | Jin et al. |
| 8,288,970 B2 | 10/2012 | Miller et al. |
| 8,337,213 B2 | 12/2012 | Puurunen et al. |
| 8,351,299 B2 | 1/2013 | Cohen et al. |
| 8,585,411 B2 | 11/2013 | Puurunen et al. |
| 8,598,817 B2 | 12/2013 | Miller et al. |
| 8,681,008 B2 | 3/2014 | Jimenez et al. |
| 8,690,579 B2 | 4/2014 | Ikkink et al. |
| 8,717,852 B2 | 5/2014 | Cohen et al. |
| 8,863,343 B2 | 10/2014 | Iwahori |
| 8,918,940 B2 | 12/2014 | Gatzemeyer et al. |
| 8,943,635 B2 | 2/2015 | Heil et al. |
| 9,003,590 B2 | 4/2015 | Utsch et al. |
| 9,049,920 B2 | 6/2015 | De Vries et al. |
| 9,072,370 B2 | 7/2015 | Gatzemeyer et al. |
| 9,168,117 B2 | 10/2015 | Yoshida et al. |
| 9,204,947 B2 | 12/2015 | Bovenkamp et al. |
| 9,277,979 B2 | 3/2016 | Ikkink et al. |
| 9,326,594 B2 | 5/2016 | De Vries et al. |
| 9,408,681 B2 | 8/2016 | Bates et al. |
| 9,427,078 B2 | 8/2016 | Farrell et al. |
| 9,445,877 B2 | 9/2016 | Wong et al. |
| 9,498,053 B2 | 11/2016 | Patel |
| 9,569,636 B2 | 2/2017 | Ricci et al. |
| 9,628,014 B2 | 4/2017 | Klemm et al. |
| 9,750,586 B2 | 9/2017 | Hwang et al. |
| 9,888,763 B2 | 2/2018 | Doll et al. |
| 10,022,025 B2 | 7/2018 | Powell et al. |
| 10,055,548 B2 | 8/2018 | Jorgenson et al. |
| 10,058,408 B2 | 8/2018 | Klemm et al. |
| 10,064,711 B1 | 9/2018 | Richter et al. |
| 10,117,508 B2 | 11/2018 | Vetter et al. |
| 10,172,443 B2 | 1/2019 | Wang et al. |
| 10,188,203 B2 | 1/2019 | Van Gool et al. |
| 10,258,142 B2 | 4/2019 | Knickerbocker et al. |
| 10,282,976 B2 | 5/2019 | Pfenniger et al. |
| 10,298,471 B2 | 5/2019 | Bauer et al. |
| 10,349,733 B2 | 7/2019 | Serval et al. |
| 10,398,538 B2 | 9/2019 | Gatzemeyer et al. |
| 10,413,052 B2 | 9/2019 | Tamminga et al. |
| 10,441,175 B2 | 10/2019 | Xi et al. |
| 10,543,069 B2 | 1/2020 | Tamminga et al. |
| 10,582,764 B2 | 3/2020 | Gatzemeyer et al. |
| 10,595,626 B2 | 3/2020 | Jeanne et al. |
| 10,646,029 B2 | 5/2020 | Serval et al. |
| 2002/0124864 A1 | 9/2002 | Gross et al. |
| 2003/0070998 A1 | 4/2003 | Bulka |
| 2003/0166373 A1 | 9/2003 | Whitney et al. |
| 2005/0217456 A1 | 10/2005 | Hodesh et al. |
| 2006/0040246 A1 | 2/2006 | Ding et al. |
| 2006/0207043 A1 | 9/2006 | Yamamoto |
| 2007/0050931 A1 | 3/2007 | Jimenez et al. |
| 2008/0109973 A1 | 5/2008 | Farrell et al. |
| 2008/0113150 A1 | 5/2008 | Lee |
| 2008/0311282 A1 | 12/2008 | Hammon |
| 2009/0038639 A1 | 2/2009 | Yetukuri et al. |
| 2009/0064429 A1 | 3/2009 | Hall et al. |
| 2009/0064430 A1* | 3/2009 | Jimenez ............. A46B 15/0006 15/22.1 |
| 2009/0081610 A1 | 3/2009 | Hayman et al. |
| 2009/0092955 A1 | 4/2009 | Hwang |
| 2009/0291422 A1* | 11/2009 | Puurunen ........... A46B 15/0006 434/263 |
| 2009/0313801 A1 | 12/2009 | Jimenez et al. |
| 2010/0281636 A1 | 11/2010 | Ortins et al. |
| 2010/0323337 A1 | 12/2010 | Ikkink et al. |
| 2011/0010876 A1 | 1/2011 | Iwahori et al. |
| 2011/0081624 A1 | 4/2011 | Chronister et al. |
| 2011/0275424 A1 | 11/2011 | Schmid et al. |
| 2012/0246858 A1 | 10/2012 | De Vries et al. |
| 2012/0266397 A1 | 10/2012 | Iwahori |
| 2012/0295216 A1 | 11/2012 | Dykes et al. |
| 2013/0000670 A1 | 1/2013 | Binner et al. |
| 2014/0033453 A1* | 2/2014 | Gatzemeyer ........... A61C 17/34 15/22.1 |
| 2014/0157538 A1 | 6/2014 | Jimenez et al. |
| 2014/0165311 A1 | 6/2014 | Donegan |
| 2014/0246049 A1 | 9/2014 | Ikkink et al. |
| 2014/0250612 A1 | 9/2014 | Curry et al. |
| 2014/0259469 A1 | 9/2014 | Garrigues et al. |
| 2014/0259472 A1 | 9/2014 | Bovenkamp et al. |
| 2015/0127371 A1 | 5/2015 | Dykes et al. |
| 2015/0230593 A1 | 8/2015 | Doll et al. |
| 2015/0230594 A1 | 8/2015 | De Vries et al. |
| 2015/0257636 A1 | 9/2015 | Kohler |
| 2015/0281364 A1 | 10/2015 | Connolly |
| 2016/0022024 A1 | 1/2016 | Vetter et al. |
| 2016/0067025 A1 | 3/2016 | Wong et al. |
| 2016/0081778 A1 | 3/2016 | Hwang et al. |
| 2016/0143718 A1 | 5/2016 | Serval et al. |
| 2016/0228745 A1 | 8/2016 | Rous et al. |
| 2016/0242693 A1 | 8/2016 | Rous et al. |

(56) References Cited

U.S. PATENT DOCUMENTS

| | | |
|---|---|---|
| 2016/0343270 A1 | 11/2016 | Zheng et al. |
| 2016/0374609 A1 | 12/2016 | Vetter et al. |
| 2017/0098872 A1 | 4/2017 | Sood et al. |
| 2017/0206804 A1 | 7/2017 | Roszyk et al. |
| 2017/0303673 A1 | 10/2017 | Van Gool et al. |
| 2017/0333172 A1 | 11/2017 | Zheng |
| 2018/0020819 A1 | 1/2018 | Steckling |
| 2018/0024507 A1 | 1/2018 | Godlieb |
| 2018/0064597 A1 | 3/2018 | Pathak et al. |
| 2018/0070807 A1 | 3/2018 | Kohler |
| 2018/0125623 A1 | 5/2018 | Serval et al. |
| 2018/0132602 A1 | 5/2018 | Gatzemeyer |
| 2018/0137773 A1 | 5/2018 | Gatzemeyer |
| 2018/0137774 A1 | 5/2018 | Gatzemeyer |
| 2018/0160796 A1 | 6/2018 | Jeanne et al. |
| 2018/0192765 A1 | 7/2018 | Jeanne et al. |
| 2018/0247565 A1 | 8/2018 | Varga et al. |
| 2018/0250108 A1 | 9/2018 | Tamminga et al. |
| 2018/0279763 A1 | 10/2018 | Tamminga et al. |
| 2019/0008270 A1 | 1/2019 | Hardeman et al. |
| 2019/0008619 A1 | 1/2019 | Jeanne et al. |
| 2019/0045916 A1 | 2/2019 | Jeanne et al. |
| 2019/0059571 A1 | 2/2019 | Jeanne |
| 2019/0083215 A1 | 3/2019 | Serval et al. |
| 2019/0104837 A1 | 4/2019 | Edwards et al. |
| 2019/0138690 A1 | 5/2019 | Adams et al. |
| 2019/0139632 A1 | 5/2019 | Adams et al. |
| 2019/0313783 A1 | 10/2019 | Serval et al. |
| 2019/0374321 A1 | 12/2019 | Gittins et al. |
| 2020/0000342 A1 | 1/2020 | Xi et al. |
| 2020/0179089 A1 | 6/2020 | Serval et al. |

FOREIGN PATENT DOCUMENTS

| | | |
|---|---|---|
| CN | 102036581 A | 4/2011 |
| CN | 102883678 A | 1/2013 |
| CN | 202959285 U | 6/2013 |
| CN | 105982756 A | 10/2016 |
| CN | 107072388 A | 8/2017 |
| EP | 3010441 B1 | 11/2019 |
| JP | 2010184489 A | 8/2010 |
| WO | WO-2006003598 A1 | 1/2006 |
| WO | 2006/137648 A1 | 12/2006 |
| WO | 2009/141489 A1 | 11/2009 |
| WO | WO-2013101300 A1 | 7/2013 |
| WO | 2015/061651 A1 | 4/2015 |
| WO | 2016/046701 A1 | 3/2016 |

OTHER PUBLICATIONS

National Intellectual Property Administration of the People's Republic of China; Application No. 201980021818.2; First Office Action dated Jul. 5, 2021; 21 pages.

* cited by examiner

TOOTHBRUSH SYSTEM

CROSS-REFERENCE TO RELATED APPLICATIONS

The present application claims priority to U.S. Provisional Patent Application No. 62/624,433 to May et al., filed Jan. 31, 2018, and entitled "A Toothbrush System With Improved Tracking, Feedback, Data Storing, Communication And Evaluation Features And Methods Therefor", and incorporates its disclosure herein by reference in its entirety.

TECHNICAL FIELD

The present disclosure generally relates to dental instruments and, in particular, to toothbrush systems and/or interchangeable motor devices for toothbrushes having improved tracking, feedback, data storing, communication and/or evaluation capabilities.

BACKGROUND

Brushing of teeth is essential to maintaining good oral health. Various manual and electric toothbrushes exist that allow consumers to select a toothbrush that is geared towards their specific desires and needs. A toothbrush is used to clean teeth, gums, and tongue. It typically includes a brush head having a plurality of bristles, on which toothpaste is applied, and a handle that allows the user to clean hard-to-reach areas of the mouth. Toothbrushes are available with different bristle textures, sizes, forms, etc. Soft bristle toothbrushes can minimize damage to tooth enamel and provide less irritation to the gums. While manual toothbrushes are able to provide adequate cleaning of the teeth, it has been discovered that electric toothbrushes while not only providing superior cleaning, also reduce incidence of various dental diseases, such as gingivitis, plaque, etc. These brushes are typically more costly because of the integrated electronics. Further, various components of electric toothbrushes occasionally breakdown, requiring replacement of the entire toothbrush. Moreover, conventional toothbrushes are unable to provide useful feedback to the user on the user's brushing habits.

SUMMARY

In some implementations, the current subject matter relates to a toothbrush apparatus that may provide improved tracking, feedback, data storing, communication and/or evaluation capabilities. The apparatus may include a sensing module that performs at least one of the following: detection of at least one time period associated with use of the toothbrush apparatus, detection of one or more movements of the toothbrush apparatus, and any combination thereof. The apparatus's one or more processors communicatively coupled to the sensing module may determine one or more measurements based on at least one of: the detected time periods, the detected movements, and any combination thereof, and store the determined measurements in one or more memory locations communicatively coupled to the processors. The apparatus may also include one or more feedback modules that receive the stored measurements and encode the measurements into corresponding feedback signals. One or more data transfer modules may transmit the feedback signals.

In some implementations, the current subject matter may include one or more of the following optional features. The toothbrush apparatus may also include a brush head, and a housing including an interchangeable motor module, and the feedback modules. The interchangeable motor module may include one or more power modules, one or more memories, and the processors.

In some implementations, the time periods may include at least one of the following: a start time for using the toothbrush apparatus, an end time for using the toothbrush apparatus, a length of time during which the toothbrush apparatus is being used, a number of times the toothbrush apparatus is used, a duration between at least two uses of the toothbrush apparatus, and any combination thereof. In some implementations, the sensing module may include at least one of the following: an accelerometer, a clock, a monitoring module, and any combination thereof. Further, the measurements may be separately determined for each user in a plurality of users of the toothbrush apparatus. Additionally, the measurements may include at least one of the following: a brushing intensity, a brushing pressure, one or more parameters associated with brushing movements, a location of the toothbrush apparatus in a mouth of a user during brushing, a coverage of brushing, and any combination thereof.

In some implementations, the transfer modules may be configured to transmit the one or more to one or more external devices communicatively coupled to the toothbrush apparatus. The external devices may be configured to decode the feedback signals, and generate, based on the decoded feedback signals, one or more reports indicative of the use of the toothbrush apparatus.

In some implementations, the feedback signals may include at least one of the following: an audio signal, a visual signal, an optical signal, an ultrasound signal, a vibration, and any combination thereof. Further, the feedback signals may correspond to a different time period during which the toothbrush apparatus is used. Also, the feedback signals may correspond to one or more parameters (e.g., speed, intensity, location, positioning, orientation, power consumption, etc.) associated with operation of the toothbrush apparatus.

In some implementations, the measurements may be stored in the memory locations using a predetermined resolution in a compressed format. The measurements may be compared to one or more predetermined usage values. The predetermined usage values may include at least one of the following: a minimum length of time for a brushing, a maximum length of time for a brushing, a minimum length of time between brushings, a maximum length of time between brushings, a desired pressure exerted by bristles of a toothbrush head on the user's teeth and/or gums, a maximum level of motion of the toothbrush apparatus, a minimum level of motion of the toothbrush apparatus, a desired brushing coverage within regions of the user's mouth, a length of time of the toothbrush apparatus at particular regions, and any combination thereof. Further, the feedback signals may be generated based on the comparison of the measurements to the predetermined usage values.

In some implementations, the feedback signals may be generated automatically, at predetermined period of time, or after each use of the toothbrush apparatus. Further, the feedback signals may be generated based on a mode of operation of the toothbrush apparatus. The mode of operation may include at least one of the following: a low mode, a high mode, a soft mode, a whitening mode, a gentle mode, a firm mode, a communications mode, and any combination thereof.

In some implementations, the feedback signals may include one or more audio signals having a predetermined range of frequencies. The frequencies may include layered tone frequencies, where the feedback modules, using the layered tone frequencies, may be configured to encode one or more measurements using a high bitrate. Each frequency in the predetermined range of frequencies may correspond to a predetermined value indicative of predetermined use of toothbrush apparatus.

In some implementations, the current subject matter relates to a method for tracking, recording, and generating feedback of use of a toothbrush apparatus. The method may include detecting at least one time period associated with use of the toothbrush, one or more movements of the toothbrush, and any combination. One or more measurements may be determined based on at least one of: the detected time periods, the detected movements, and any combination thereof, and stored in a memory location. The measurements may be encoded into corresponding feedback signals. The feedback signals may be transmitted. In some implementations, the current subject matter may include one or more of optional features discussed above.

In some implementations, the current subject matter relates to a medical system. The system may include a toothbrush apparatus, which may include a sensing module configured to perform at least one of the following: detect at least one time period associated with use of the toothbrush apparatus, detect one or more movements of the toothbrush apparatus, and any combination thereof. The system may also include one or more processors communicatively coupled to the sensing module and configured to determine one or more measurements based on at least one of: the one or more detected time periods, the one or more detected movements, and any combination thereof of the toothbrush apparatus, and store the determined measurements in one or more memory locations communicatively coupled to the processors. The apparatus may further include one or more feedback modules configured to receive the stored measurements and encode the measurements into corresponding one or more feedback signals, and one or more data transfer modules configured to transmit one or more feedback signals. The medical system may further include a decoding module communicatively coupled to the toothbrush apparatus. The decoding module may be configured to receive and decode the feedback signals into one or more values representative of the use of the toothbrush apparatus. The above optional features may also be included in this system.

The details of one or more variations of the subject matter described herein are set forth in the accompanying drawings and the description below. Other features and advantages of the subject matter described herein will be apparent from the description and drawings, and from the claims.

BRIEF DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

In some implementations, the current subject matter relates to a dental cleaning system and interchangeable motor device having improved tracking, feedback, data storing, communication and evaluation features is provided. The dental cleaning system may be a toothbrush system. The toothbrush system provides improved tracking of user brushing behavior and system operating performance. The tracked information may be stored in a local memory within the interchangeable motor device which provides secure, long term storage of the data. The toothbrush system may further include one or more feedback devices which may provide feedback to the user concerning the user's brushing behavior and/or the system performance. The data stored in the system may be transferred to an external computing device by generating encoded feedback from the feedback devices. The feedback may be received by the external computing device and may be decoded into the user and/or system data. The data may then be transferred to an evaluation device for further review and/or analysis of the data in order to provide further services and/or notifications to the user and/or third parties. The system may further include power conserving features, such as a low power sleep state, to maximize power efficiency.

In some implementations, the current subject matter relates to a dental appliance (e.g., a toothbrush system) that may include an accelerometer that may be configured to detect one or more movements of the dental appliance (e.g., the toothbrush being turned on, brushing with the toothbrush being initiated, the toothbrush is operating in a particular quadrant of the mouth, a particular pressure being applied to the teeth (e.g., a sensor may sense a force, a feedback, etc. being applied to the teeth using bristles of the brush head), the toothbrush is being oriented in a particular direction, the toothbrush is being moved in a specific movement pattern (e.g., straight, circular, etc.), etc.). The toothbrush system may further include one or more processors that may be communicatively coupled to the accelerometer and may be configured to determine one or more measurements based on the detected movements of the dental appliance and store the determined measurements in one or more memory locations communicatively coupled to the processor(s). The toothbrush system may also include one or more feedback devices or modules that may be configured to receive stored measurements and may encode the measurements into corresponding feedback signals. The toothbrush system's one or more transfer devices may be configured to transmit the feedback signals to one or more external devices that may be configured to be communicatively coupled to the dental appliance.

Figure 1:
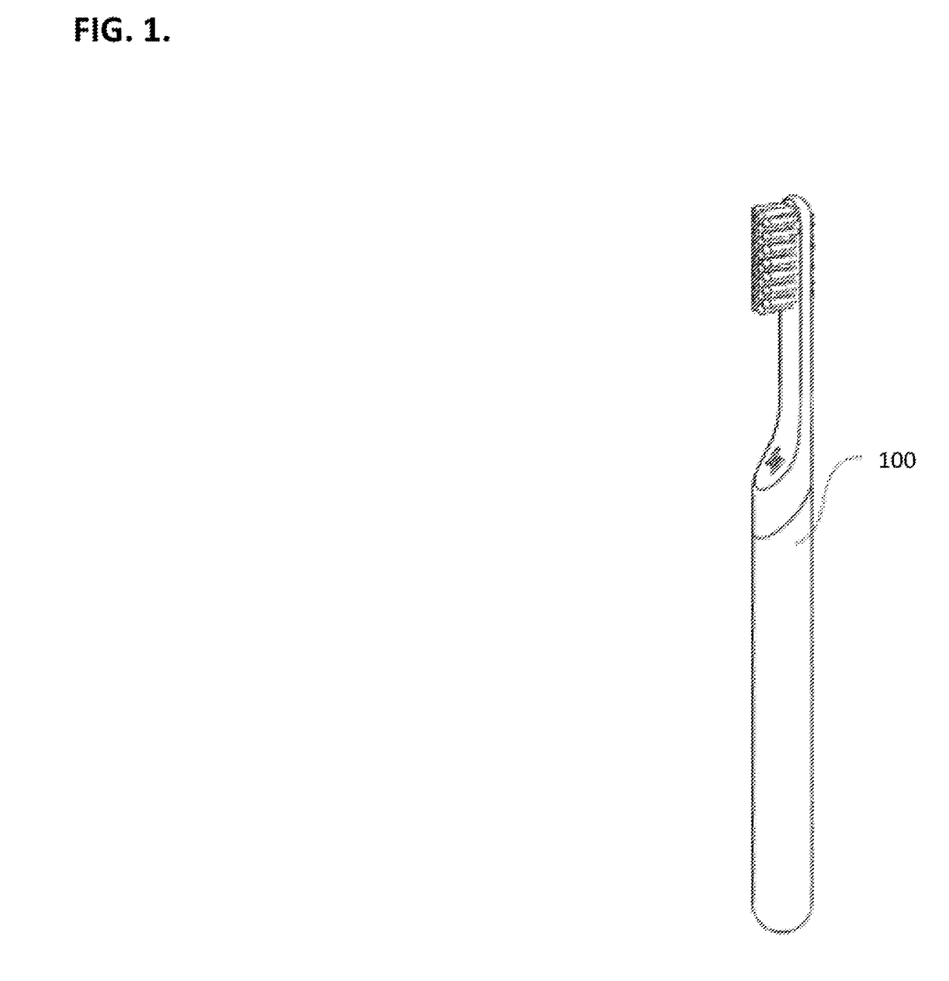
FIG. 1 illustrates an exemplary toothbrush system, according to some implementations of the current subject matter.
Figure 2:
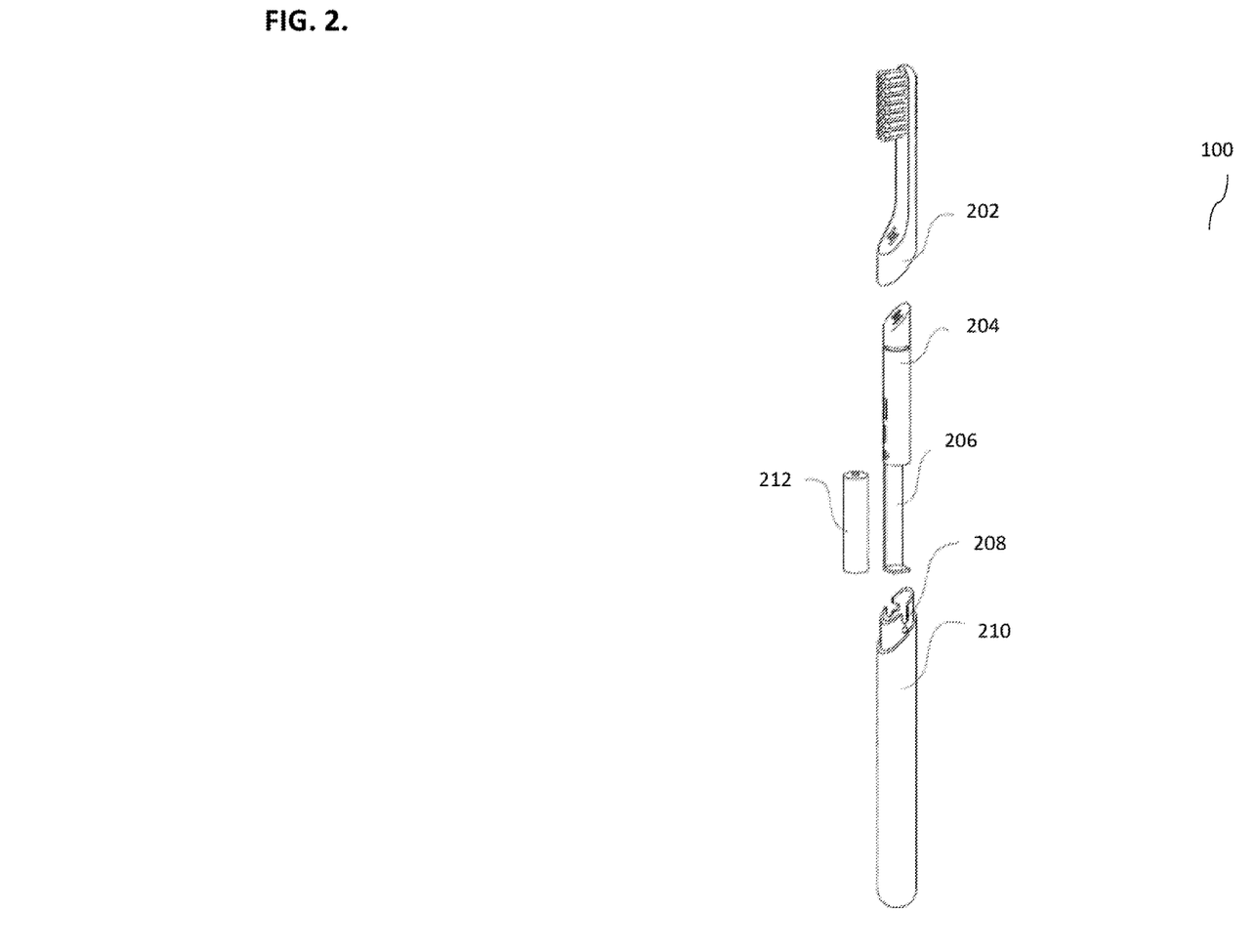
FIG. 2 illustrates an exploded view of the exemplary toothbrush system shown in FIG. 1, according to some implementations of the current subject matter.

FIG. 1 illustrates a perspective view of an exemplary toothbrush system 100, according to some implementations of the current subject matter. FIG. 2 illustrates an exploded view of the exemplary toothbrush system 100 shown in FIG. 1. The toothbrush system 100 may have a modular design which may enable easy and low cost replacement of parts and/or to maximize user customization options. By reducing cost and/or difficulty of both manufacture and installation, and/or by enabling users to customize their individual toothbrush with custom parts (e.g., bought and/or made themselves), users may choose parts that may be ergonomically comfortable, and/or aesthetically pleasing to each individual user, and/or enable low cost maintenance, replacement of parts, manufacturing, etc.

In some implementations, as shown in FIG. 2, the toothbrush system 100 may include a toothbrush head 202, a motor component 204, a battery compartment 206 within the motor assembly component 204 for accommodating placement of a battery 212, and a handle 210 having a locking mechanism 208. An exemplary toothbrush system is disclosed in the co-owned, co-pending U.S. patent application Ser. No. 14/522,805 to May, the disclosure of which is incorporated herein by reference in its entirety. The combined motor assembly 204 and the battery 212 may be placed inside the handle 210 and/or head 202, and the two remaining parts (e.g., handle 210, head 202) may securely connect to each other through the locking mechanism 208.

If the user wishes to purchase and/or install a separate custom version of the handle 210 with a unique shape, color, or design, the user may purchase and replace only that part (e.g., handle 210) on their toothbrush, which reduces the cost of customizing the toothbrush system 100 by changing the design of the toothbrush system 100 easily without the use of tools.

The separation of the toothbrush system 100 into four smaller, modular parts that are easily disassembled may significantly reduce the cost of replacing the handle 210 and/or the head 202, and may increase the ease of replacing parts of the toothbrush in order to customize the design. In some implementations, the design of the toothbrush system 100 may also reduce manufacturing costs by minimizing the number of parts and/or assembly needed by the factory during production. The handle 210 may also be designed to have a simple geometry so that users inexperienced with three dimensional (3D) design software may be able to easily modify the external shape and/or appearance to suit their particular desire for function and/or aesthetics.

In some implementations, the motor assembly 204 and battery 212 may not be included, and/or may be optional parts of the toothbrush system 100. As the head 202 and handle 210 may be able to connect to each other securely using the locking mechanism 208, they may be able to act by themselves (e.g., without a motor and/or battery) as a fully capable, non-electric toothbrush. The inclusion of the motor assembly 204 and/or battery 212 may be optional, and may be added at a later time, or not at all, depending on the preferences of a particular user.

It is noted that a user may upgrade his/her toothbrush by purchasing and installing, without the use of tools, the motor assembly 204 and battery 212 separately to improve the functionality of their toothbrush system 100 to include the electric vibratory motor feature. Additionally, it is noted that if the motor assembly 204 is damaged and/or becomes dysfunctional, it may be possible to replace only that part, without requiring the use of tools, which reduces costs (e.g., the cost of maintenance for the user, the cost of warranty for the manufacturer, etc.), and enables simple repair and replacement by a user.

In some implementations, the toothbrush system 100 may also include an activation button (not shown in FIGS. 1-2) that may be pressed by the user to activate and/or deactivate the toothbrush, switch between modes of operation (e.g., regular brushing, whitening, sensitive teeth, a communications mode, etc.). The button may be electrically coupled to the motor assembly component 204. In alternate implementations, the toothbrush system 100 may be activated by moving the toothbrush system 100 from one location to another. Further, the toothbrush system 100, once activated, may remain in operational state for a predetermined period of time (e.g., 2 minutes). The operational state of the toothbrush system 100 may be maintained upon continuous/periodic detection of movement of the toothbrush system 100. If after initial movement of the toothbrush system 100, the toothbrush system 100 is not moved again, it may be deactivated automatically. In some implementations, in a communication mode, the toothbrush system 100 may be configured to transmit and/or receive data to/from one or more external devices. To initiate the communication mode, the activation button may be pressed and/or held by the user for a predetermined period of time (e.g., 5 seconds), subsequent to which the toothbrush system 100 may initiate transmission of signals/data to an external device (e.g., data relating to brushing (e.g., times, duration, pressure, intensity, frequency, etc.)) and/or receive signals/data (e.g., relating to an update of software of the toothbrush system 100, operational parameters, etc.). The communication mode may be terminated upon pressing the activation button again (e.g., either temporarily and/or for a predetermined period of time) and/or automatically, such as upon completion of data transmission/receipt. In some exemplary implementations, upon initiation of the communication mode, the toothbrush system 100 may perform a broadcast of signals/data in order to establish a communication channel with an appropriate external device and/or, upon performing appropriate authentication procedures, transmit/receive data to/from authenticated external device.

Figure 3:
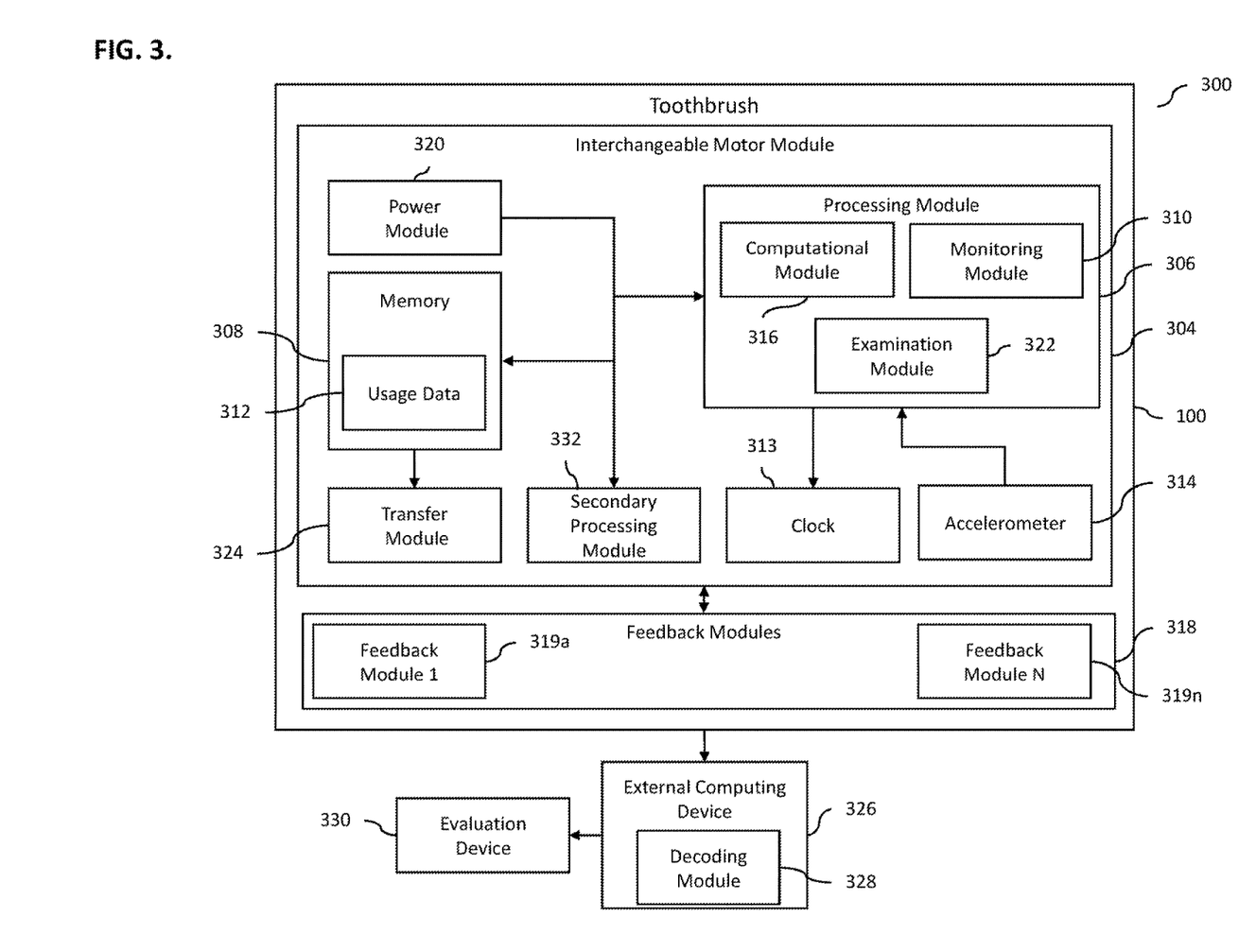
FIG. 3 is a block/flow diagram illustrating an exemplary toothbrush system, according to some implementations of the current subject matter.

FIG. 3 illustrates an exemplary toothbrush system 300, according to some implementations of the current subject matter. The system 300 may include a toothbrush system 100 that may be communicatively coupled to an external computing device 326 (including a decoding module 328), which, in turn, may be communicatively coupled to an evaluation device 330. The toothbrush system 100 may include an interchangeable motor module 304 that may be communicatively coupled to one or more feedback modules 318 (e.g., feedback modules 1, . . . N 319 (a, . . . , n)). The modules may be incorporated onto a flexible printed circuit board as various electro-mechanical components and may be communicatively coupled to one another using wired and/or wireless connections.

The motor module 304 may include a processing module 306, a memory 308, a clock 313, an accelerometer 314, a power module 320, a transfer module 324, and a secondary processing module 332. As can be understood, one or more of such modules may be included in the motor module 304. The processing module 306 may include a monitoring module 310, a computational module 316, and an examination module 322. The memory 308 may allocate a portion for storage of usage data 312. In some implementations, the motor module may include one or more sensing module(s), sensing element(s), and/or sensor(s) (hereinafter, "sensing module(s)"). The sensing module(s) may incorporate one or more of the modules above, including but not limited to, the accelerometer 314, timer and/or clock 313, monitoring module 310, computation module 316, examination module 322, secondary processing module 332, transfer module 324, and/or any other modules and/or any combination thereof. The sensing module(s) may be configured to perform detection and/or tracking of one or more movements of the toothbrush system 100 (e.g., location of the toothbrush system 100 in the user's mouth, motion of the toothbrush system 100 in the user's mouth, pressure applied by the toothbrush system 100 during brushing, etc.), times when toothbrush system 100 is being used (e.g., start time of teeth brushing, end time of teeth brushing, length of teeth brushing, time between teeth brushings, frequency of teeth brushings, etc.). In some implementations, the toothbrush system 300 may provide improved tracking, feedback, data storing, communication and evaluation features is provided.

In some implementations, the interchangeable motor module 304 may be received in an existing toothbrush and/or may be configured to provide motorized brushing functionality to the toothbrush as well as provide the improved tracking, feedback, data storing, communication and evaluation features. In some implementations, while the system 300 is generally described as including an interchangeable motor module, the motor module may be integrated into the toothbrush during the manufacturing process and/or may not be configured to be interchangeable by the user. As can be understood, one or more of the above modules may be integrated together and/or be separately disposed in the toothbrush system 100.

The interchangeable motor module 304 may include battery contacts to provide electrical conductivity with the power module 320, such as one or more batteries. The power module 320 may be configured to monitor the power from the power source and/or selectively enable power to be directed to one or more components of the system 300, including the components of the motor module 304 and/or feedback modules 319. The interchangeable motor module 304 may also include a switch for activating the motor device. Alternatively, the motor module 304 may be activated automatically upon detecting movement of the toothbrush 100.

In some implementations, the processing module 306 may be included on a circuit board that is secured to the interchangeable motor device. The circuit board may be a flexible printed circuit board assembly ("PCBA"). The flexible PCBA may provide various advantages in that it may permits the processing module 306 to maximize the available space within the cavity of the toothbrush. For example, the flexible PCBA may be configured in a folded switch back design. The flexible PCBA may be weaved in a snake-like fashion within the cavity of the toothbrush or placed into an S-formation to stack components efficiently. The flexible PCBA may also provide a solderless assembly for improved manufacturing efficiency and reliability. In some implementations, the processing module 306 may be included on other circuit boards and/or devices. For example, the processing module 306 may be a combination of rigid and/or flexible printed circuit board assembly(ies) that may optimize cost, value, capability, efficiency and/or spatial parameters for the processing module 306.

The processing module 306's monitoring module 310 (and/or any sensing module(s)) may be configured to track usage data 312 concerning use of the toothbrush by one or more users. For example, the processing module 306 may be communicatively coupled to the clock 313 and/or other time measurement/tracking module/device. The monitoring module 310 may be configured to operate together with the clock 313 to determine when the toothbrush 100 is being used by the user(s). In some exemplary, non-limiting, implementations, the monitoring module 310 may be configured to receive time information from the clock 313 and record the time that the user begins brushing his/her teeth and stops brushing his/her teeth. In some implementations, in addition to recording starting and ending times of brushing, the clock 313 may also record a total time that the brushing and/or other use of the toothbrush has occurred.

In some implementations, the monitoring module 310 (and/or any sensing module(s)) may be configured to automatically determine that the toothbrush is being used when a button on the toothbrush that activates the switch on the interchangeable motor device is depressed. The monitoring module 310 may be configured to automatically determine that the brushing is finished when the button on the toothbrush is pressed again and the switch on the interchangeable motor device is turned off. In alternate implementations, the monitoring module 310 may be configured to determine when the toothbrush is used by other means, such as utilizing measurements from an accelerometer and/or other physical measurements concerning the toothbrush.

In some implementations, the accelerometer 314 (and/or any sensing module(s)) may be included on the processing device 106 and/or may be included on other portions of the interchangeable motor module 304 (as shown in FIG. 3) and/or toothbrush 100. The accelerometer 314 may be configured to collect measurements during usage of the toothbrush 100 by the user. The accelerometer 314 may be configured to obtain measurements concerning brushing intensity, brushing pressure, variety of brushing movements, location of the toothbrush during a brushing, coverage of brushing, etc. and/or any combination thereof. The system 300 may include additional monitoring devices (and/or any sensing module(s)), which may monitor physical features concerning the toothbrush system and/or user. For example, the toothbrush system 100 may be used by different users (e.g., upon exchanging of the head 202 shown in FIG. 2), whereby the toothbrush system 100 may be configured to detect that a different user is using the toothbrush by, for example, detecting exchange of the head 202 and prompting the user to confirm their identity. Once new user identity is confirmed, the system 100 may be configured to track usage data associated with different users.

The monitoring module 310 may further include a computational module 316 which may be configured to receive measurements concerning usage of the toothbrush by the user(s), including time measurements, accelerometer measurements, etc. and compute data concerning the usage. For example, the computational module 316 may be configured to determine the time length between the user's prior brushing and the present brushing, the time length of the user's present brushing, measurements concerning the user's brushing behavior, etc.

The computational module 316 may also include predetermined values relating to desired measurements or measurement ranges for the data concerning usage of the toothbrush by the user and/or system operational data (collectively, the "usage data" 312). For example, the computational module 316 may include predetermined values representing a minimum and maximum length of time for a brushing, a minimum or maximum length of time between brushings, a desired pressure exerted by the bristles of the toothbrush on the user's teeth/gums, maximum and minimum levels of motion of the toothbrush, desired coverage within regions of the user's mouth, length of time of the toothbrush at particular regions, etc. The computational module 316 may be configured to compare the measured usage data to the predetermined values and determine if the usage data is in compliance with such values.

The feedback modules 319 may be integrated into the toothbrush system 100 and may include an audio device, a vibrational device, a visual feedback device, such as an LED light or display, a haptic device and/or any other feedback devices. The vibrational device may be a portion and/or aspect of the motor or a separate vibrating feedback device.

The feedback modules 319 may be configured to generate feedback to the user concerning the usage data, system operational characteristics, etc. For example, if the usage data is in compliance and/or is not in compliance with a predetermined desired value, the computational module 316 may be configured to activate the feedback modules 319 to provide specific feedback to the user indicating such compliance and/or non-compliance. The feedback signals may include audio signals, such as a beep, changes in the vibration pattern, a light being activated, a display generating a readable message, etc.

As an example, if the length of time between brushings exceeds a predetermined maximum length of time, an audio device 319 may generate an audio signal and/or a visual feedback device may generate visual feedback. Similar feedback may be generated if the computational module 316 determines that brushing pressure is too high or too low, an accelerometer 314 shows too much or too little motion, the length of the brushing time is too long or too short or any other parameter concerning the brushing behavior is not in compliance or is in compliance, etc.

Additionally, the feedback modules 319 may be configured to generate feedback based on cumulative usage data. For example, a goal such as twenty consecutive brushings that are on time by the user may be indicated with the generation of a pleasing audio tone.

In some implementations, the feedback signals provided by the feedback modules 319 may be provided immediately after the user is done using the toothbrush. For example, the system 100 may be configured so that the audio device generates an unpleasant or "angry" beep after the user brushes his/her teeth to signal that the user missed a brushing or the brushing was late. The system may generate a pleasant beep after the brushing to signal that the brushing was on time. In alternate implementations, the feedback signals provided by the feedback modules 319 may be provided when the user begins using the toothbrush.

In some implementations, the system 100 may be configured to generate feedback signals in regular time increments and/or at specific times. For example, the system 100 may include a child mode, which may be configured to remind children to brush their teeth at one or more specific times during the day or one or more time intervals during the day (e.g., 8 hours after the user's last brushing). In the child mode, the feedback modules 319 may be configured to generate reminders that attract the child's attention and motivate the child to use the toothbrush, such as a pleasing or entertaining audio signal.

The system may also be configured so that the feedback modules 319 provide feedback signals during regular time increments during the brushing by the user. In some exemplary, non-limiting implementations, the feedback modules 319 may be configured to provide feedback every 30 seconds to indicate to the user that the toothbrush should be moved to a different quadrant of the mouth. This feedback signal may be an audio signal, a vibrational signal, etc. Additionally, the toothbrush system 100 may have various different brushing modes, such as a low mode, high mode, soft mode, whitening mode, gentle mode, firm mode, etc. The system may be configured to trigger the feedback modules 319 to provide feedback signals indicating that the user should change the current brush mode to another mode.

In some implementations, the system 100 may be configured so that the power module 320 automatically disables power to the interchangeable motor module 304 after the brush has been used for a specific length of time, e.g., two minutes.

The system 100 may also be configured so that the feedback modules 319 generate feedback signals based on system operational characteristics. For example, the computational module 316 may be configured to compare a current power level of the power source as determined by the power module 320 with a predetermined minimum power reserve level. The feedback modules 319 may be configured to generate feedback signals, such as an audio and/or visual warning and/or vibration if the power is below the predetermined minimum power level.

The system 100's examination module 322 may be configured to monitor the operational performance of the system. The examination module 322 may determine that one of the components of the system 100, such as the toothbrush head or motor has malfunctioned. In some implementations, the examination module 322 may be configured to trigger the feedback modules 319 to provide feedback signals upon detection of a malfunction.

The processing module 306 including the monitoring module 310 and computational module 316 may be configured to store the tracked usage data 312 in memory 308. The system 100 may also be configured so that other tracked data, such as operational performance data determined by the examination module 322 may be stored in the memory 308. The memory 308 may be any computer-usable and/or computer readable storage medium, such as electronic, magnetic, optical and electromagnetic storage mediums, and/or any combinations thereof.

The memory 308 may provide local storage of data pertaining to the user and/or the system 100. The data may be stored for a long period of time (and/or any other predetermined period of time) in the memory 308 in a secure manner. By way of a non-limiting example, the data may be stored for 1-3 years (and/or any other period of time) in the memory 308. The data may also be stored in selective levels of resolution to reduce memory usage.

The transfer module 324 may be configured to transfer data stored in the memory 308 to an external computing device 326. The external computing device 326 may be a smartphone, tablet, personal computer, etc. In some implementations, the transfer module 324 may be configured to encode the data stored in the memory into feedback signals that may be generated by the feedback modules 319. The feedback signals may be received by the external computing device 326. For example, the external computing device 326 may include a microphone to receive audio feedback and/or vibrational feedback. In some implementations, the external computing device 326 may include an optical reader to receive visual feedback and/or another type of receiving device to receive feedback from the feedback modules. The external computing device 326 may include a decoding module 328 that may decode the received feedback signals into a predetermined data format. In some implementations, the decoding module 328 may include a lookup table code to convert the received feedback signals into specific user data and/or system data. The following illustrates an exemplary lookup table code that may be implemented by the current subject matter toothbrush system:

```
#define    TONE_LENGTH    100   // in milliseconds
// The tone value is the period of the PWM waveform, at 1 uSec per count.
// So a value of 128 is a period of 128 uSec for a freq = 7813 Hz.
// "Arbitrary" Tone Set
const uint16_t tone[ ] = {
    128,       // 7813 Hz, tone 0
```

```
    133,     // 7519 Hz
    139,     // 7194 Hz
    145,     // 6897 Hz
    152,     // 6579 Hz
    159,     // 6289 Hz
    167,     // 5988 Hz
    175,     // 5714 Hz
    185,     // 5405 Hz
    196,     // 5102 Hz
    208,     // 4808 Hz
    222,     // 4505 Hz
    238,     // 4202 Hz
    256,     // 3906 Hz
    278,     // 3597 Hz
    303      // 3350 Hz, tone 15
};
```

The current subject matter toothbrush system may be configured to read data from a read-only memory (e.g., the EEPROM) and break it into 4-bit portions of data. Each of the 4-bit portions of data may represent 16 different values (i.e., from 0 to 15). The values may be used as indices in the table. Thus, if the value is 0 then the [0] element may be retrieved from the table, which may be 128 (as shown above). This may be used as the period of the waveform, which may correspond to an audio frequency of 7813 Hz (as shown above). If the data portion's value is 1, then the [1] element is retrieved, which is 133 (as shown above), which may correspond to an audio frequency of 7519 Hz (as again shown above). The process continues for the remaining data portions/elements for the purposes of decoding.

By way of a non-limiting example, the toothbrush system 100 may be configured to track movement of the toothbrush system 100 during brushing by the user for a first period of time, e.g., 2 minutes, non-movement during a second period of time (e.g., between brushings), e.g., 8 hours, and movement of the toothbrush during subsequent brushing by the user for a second period of time, e.g., 2 minutes. The tracked data may also include other data, such as date, time of day the above time periods occurred, intensity of brushing, pressure applied, quadrants used, power consumed, power source level, etc. Based on the tracked data, the toothbrush system 100 may be determine measurements associated with the above data and store them into the memory 308. The measurements may be provided to the feedback modules 319. The feedback modules 319 may generate audio tones corresponding to each measurement, e.g., tone 1 for the first period of time, tone 2 for the second period of time, tone 3 for the third period of time, tone 4 for associated intensities, etc. The tones may be encoded by the transfer module 324 and then transmitted to the external computing device 326. As can be understood, the feedback signals are not limited to tones, and may include visual signals, optical signals, etc. The transfer module 324 may include an encoder that may be configured to encode feedback signals in such a way that they may be decoded by the decoding module 328 of the external computing device. Once the signals are decoded by the decoding module 328, the computing device 326 may generate a report that may contain information about user's use of the toothbrush system 100. In some implementations, the computing device may perform various analysis (e.g., including deep learning, machine learning, etc.) to assess user's brushing habits and provide appropriate indications (e.g., analysis may be performed based on brushing habits of other users, etc.), such alerts, suggestions, etc. This information may then be provided to the evaluation device 330 for further analysis and/or use by the user and/or any third parties (e.g., dentists, medical professionals, insurance companies, manufacturers, retailers, etc.).

Referring back to FIG. 3, the transfer module 324 may be configured to trigger a feedback module 319 (e.g., an audio device 319) to generate layered tone frequencies which encode data at a high bitrate. A particular frequency of audio may be mapped to a specific value. The transfer module 324 may be configured to trigger the audio device 319 to generate ultrasonic audio so that the data may be transferred without the user being able to hear the feedback. Alternatively, the transfer module 324 may trigger the feedback modules 318 to provide audible audio signals and/or a mixture of audible and/or ultrasonic audio signals to transfer the data from the memory 308 to the external computing device 326. For example, the system may be configured to provide pleasing audio signals and/or music to the user to indicate that the system is working properly while simultaneously transmitting the data by generating ultrasonic audio signals.

The transfer module 324 may also be configured so that the feedback modules 318 provide system operational data to the external computing device 326. For example, the feedback modules 318 may be configured to generate feedback that is encoded to indicate error codes, firmware revision, motor serial identifier (ID), metadata concerning the device and its components, etc. and/or any combinations thereof.

In some implementations, the data may be compressed so that common events provide feedback having a particular, predetermined level of resolution. For example, if a user brushes his/her teeth for 1.9967 minutes, the system 100 may be configured to store that data in the memory 308 as 2 minutes. The data that is transferred by the transfer module 324 may also have selective levels of resolution to maximize transfer speed. For example, in instances where the memory 308 stores the length of time that the user brushes his/her teeth as 1.9967 minutes, the transfer module 324 may be configured to trigger the feedback modules 318 to generate feedback indicating that the user brushed for 2 minutes. In some implementations, the selective level of resolution of the storage of the data and/or the transfer of the data may be predetermined or may be revised based on the amount of data stored in the memory, the level of the power reserve or other parameters.

The transfer module 324 may also be configured to compress the data utilizing known compression algorithms/methods to increase the transfer speed. The system 100 may further utilize data verification using parity bits and the like to ensure that the data was transferred correctly and that there are no errors in the data.

The transfer module 324 may be triggered to transfer data stored in the memory 308 to the external computing device 326 upon the pressing of a button (not shown in FIG. 3) on the toothbrush 100. For example, the specific length of time that the button is pressed may cause the toothbrush system 100 to perform a partial transfer (e.g., data acquired since the last transfer) and/or a complete transfer of all of the data stored in memory 308. For example, a long press of the button (e.g., which exceeds 3 seconds) may trigger a full transfer of data while a shorter press (e.g., between 1-2 seconds) may trigger a partial transfer. In alternate implementations, the transfer module 324 may be configured to automatically transfer data stored in the memory 308 to the external computing device 326 at regular time intervals or after a certain number of uses of the toothbrush system 100.

The transfer of the data stored in the memory 308 to the external computing device 326 using feedback signals that are generated by the feedback modules 318 provides numerous benefits over Wi-Fi or Bluetooth communication. For example, Bluetooth and Wi-Fi communication devices are typically expensive components that are relatively large and require non-metallic constructions. Further, radio frequency transmission of data by Bluetooth requires numerous design features which are necessary to avoid interference and to ensure proper transmission. The utilization of existing feedback devices for transfer of the data provides increased flexibility in the design of the toothbrush system 100 and interchangeable motor module 304 and provides cost efficiency benefits. In alternate implementations, Bluetooth and/or Wi-Fi communication may also be utilized to transfer the data, either in combination with or instead of, generating feedback signals by the feedback modules 318.

In some implementations, the feedback modules 318 may be configured to generate feedback signals to remind the user to transfer data to the external computing device 326. For example, the computational module 316 may determine that the length of time between the last data transfer exceeds a maximum elapsed time value since the prior data transfer and trigger the feedback devices to generate specific feedback signals which remind the user to transfer the data.

As stated above, the external computing device 326 may be configured to transfer the data received from the toothbrush to the evaluation device 330. In some implementations, the evaluation device 130 is a device included on a communications network, such as an Internet server.

In some implementations, the external computing device 326 may be configured to automatically transfer the data received from the toothbrush to the evaluation device 330 upon receipt of the data. In alternate implementations, the external computing device 326 may be configured to transfer the data to the evaluation device 330 at a specific time, time interval and/or event.

The evaluation device 330 may be configured to store the data and enable analysis of the data. For example, the evaluation device 330 may be configured to permit a dental care provider to access the data. The dental care provider may review the data and advise the user concerning his/her compliance. The dental care provider may also use the data on the evaluation device to diagnosis dental or health issues and/or to develop treatment plans, corrective care suggestions, and/or additional recommendations for the user. The dental care provider may also suggest new or revised predetermined values for the usage data to be input into the computational module 316 based on the user's dental health and brushing performance. In one embodiment, the data in the evaluation device 330 may be reviewed by a dental care provider or another reviewer and suggestions for a dental appointment may be sent to the user on the external computing device or through other means.

In some implementations, a parent may access the data on the evaluation device 330 to determine if their child's use of the toothbrush has been in compliance. For example, the parent may review the data on the evaluation device to determine if the child has skipped a brushing, brushed for an insufficient amount of time or has not brushed properly.

The data stored by the evaluation device 330 may also be configured to be accessed by the user to enable self-evaluation of the data. For example, the user may review the data for analysis of compliance and for learning pertinent data and variables that can help improve the user's brushing habits and oral health.

The data in the evaluation device 330 may also be reviewed by dental insurance companies to provide more accurate insurance quotes which reflect the user's actual brushing habits. For example, the data in the evaluation device 330 may be reviewed by a dental insurance company and a revised insurance rate may be generated and communicated to the user.

The evaluation device 330 may be provided as part of an ecosystem established by the company that manufactures, markets or sells the toothbrush to the user or is affiliated with the company. The user may have an account with the company so that the identity and personal information of the user is integrated into the data in the evaluation device.

The company may review the data and transmit the data to the insurance company, dental care provider or to another third party. The company may also review the data to analyze the product performance and develop improvements in the system components, such as the toothbrush or the interchangeable motor device. The data may also permit the company to more accurately market additional products and services to the users. Coupons or rewards may also be provided to the user based on the data to incentivize compliance.

In some implementations, the interchangeable motor module 304 may include a serialized identification number that is stored in the processing module 306, such as in the memory 308. This may ensure compatibility and/or authenticity of data being recorded and/or transferred.

The data received from the toothbrush system 100 may be encrypted to indicate that the data originated from the specific toothbrush having the serialized identification number. The serialized identification number preserves the integrity of the data and prevents the data from being manipulated. The measurements from the accelerometer 314 may also be utilized for confirming that the toothbrush has been used by the user and that the data is valid.

The serialized identification number may be paired to the account of the user that is established by the company that manufactures, markets or sells the toothbrush to the user or that is affiliated with the company. This permits the data received from the toothbrush to automatically be associated with the user account. Additionally, the serialized motor identification number may permit the user to automatically log-in to the user's account with the company. The data encrypted with the motor identification number may also function as authenticated credentials which permit the user to use the device to automatically log in to the office of a dental care provider, medical provider, etc.

The serialized identification number may be transferred by the company to another user account upon request. Additionally, new toothbrushes or interchangeable motor devices having different serialized identification numbers may be linked to the user account. This may permit the user to upgrade or replace new brushes/motors and have the devices linked to their account even while retaining the original device.

In some implementations, the interchangeable motor module 304 may include a secondary processing module 332 and/or crystal. The secondary processing module 332 may be configured to require reduced power demands as compared to the processing module 306. The secondary processing module 332 may be configured to perform limited functions when the toothbrush is not in use in order to maximize battery life. These functions may include timing functions, memory functions, communication functions, etc.

The toothbrush system 100 may be configured so that the toothbrush may operate in a sleep state wherein the processing module 306 is inactive and the secondary processing module 332 is active. This permits the system 100 to maximize battery life. For example, in one embodiment, the toothbrush may be sufficiently powered on a single AAA battery for a period of 3-6 months or longer. The low power sleep state of the system also increases the lifespan of the system by providing reduced wear on the inactive components. Alternatively, the toothbrush system 100 may be powered by a re-chargeable battery, where the toothbrush system 100 may generate a feedback signal indicative of a need to recharge the battery.

While the current subject matter is described with respect to a toothbrush system, the interchangeable motor module 304 may be configured for other dental and/or medical devices to provide improved tracking, feedback, data storing, communication and evaluation features therefor.

In some implementations, the current subject matter also relates to methods for providing improved tracking of user data and system data for a toothbrush system as described above in connection with the toothbrush system. The current subject matter also relates to methods for providing feedback to a user of a toothbrush system as described above in connection with the toothbrush system. The current subject matter further relates to improved data storage for user data and system data for a toothbrush system as described above in connection with the toothbrush system.

The current subject matter also relates to transferring user data and system data of a toothbrush system using feedback devices as described above in connection with the toothbrush system. The current subject matter further relates to methods for evaluating user data and system data using an evaluation device (which may be integrated with an established ecosystem) described above in connection with the toothbrush system. The current subject matter also relates to methods for efficiently powering a toothbrush system as described above in connection with the toothbrush system.

Having described preferred embodiments for a toothbrush system and methods (which are intended to be illustrative and not limiting), it is noted that modifications and variations can be made by persons skilled in the art in light of the above teachings. It is therefore to be understood that changes may be made in the particular embodiments of the disclosure disclosed which are within the scope of the embodiments disclosed herein as outlined by the appended claims. Having thus described the details and particularity required by the patent laws, what is claimed and desired protected by Letters Patent is set forth in the appended claims.

Figure 4:
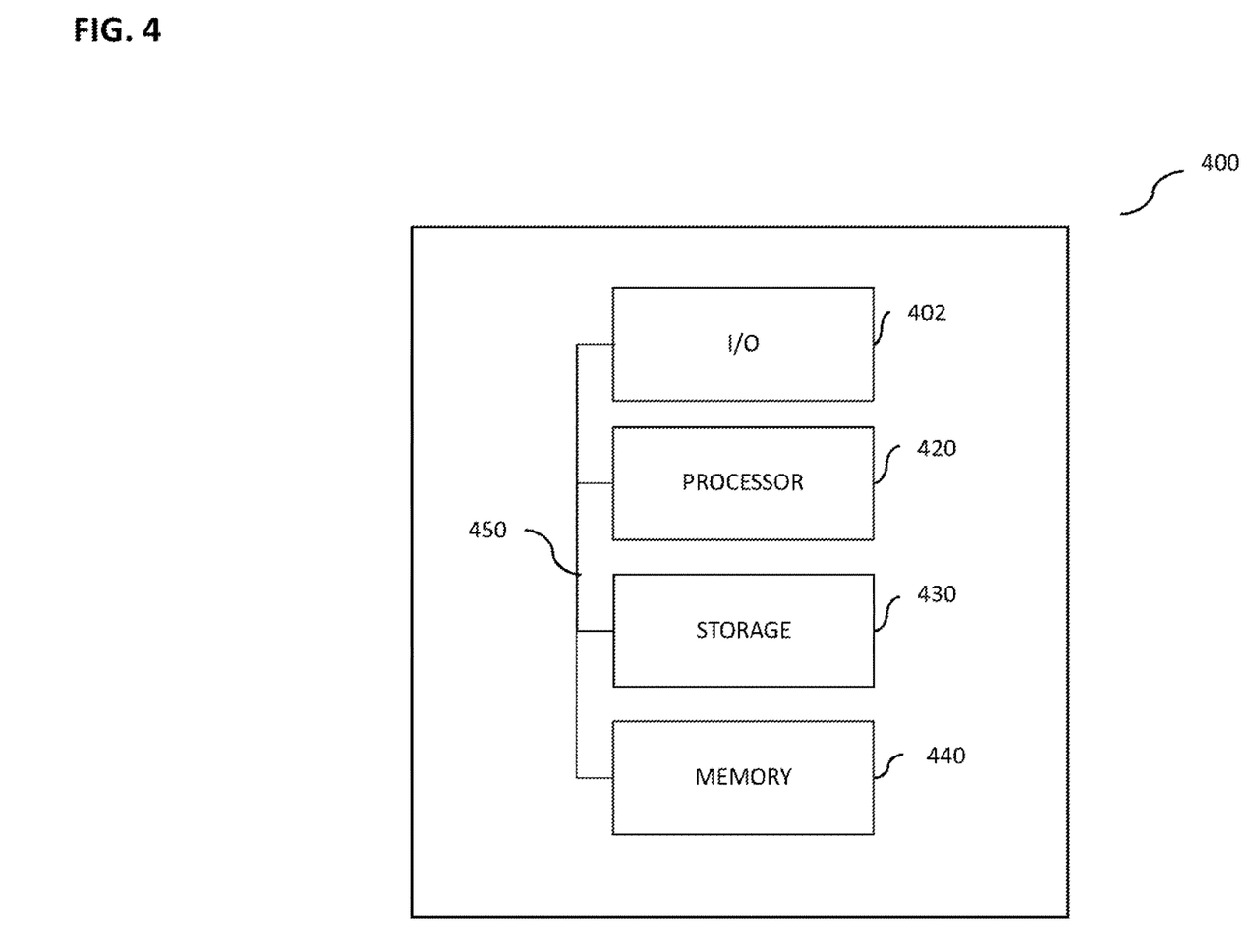
FIG. 4 is an exemplary system, according to some implementations of the current subject matter.

In some implementations, the computing components (e.g., processing modules and/or processors, memory, etc.) of the toothbrush system 100 may be configured to be implemented in a system 400, as shown in FIG. 4. The system 400 may be incorporated into the toothbrush system 300 (shown in FIG. 3) in various ways and may include a processor 404, a storage device 406, a memory 408, and an input/output (I/O) device 402. Each of the components 402, 404, 406, and 408 may be interconnected using a system bus 410. The processor 404 may be configured to process instructions for execution within the system 400. In some implementations, the processor 404 may be a single-threaded processor. In alternate implementations, the processor 404 may be a multi-threaded processor. The processor 404 may be further configured to process instructions stored in the memory 408 or on the storage 406, including receiving or sending information through the I/O 402. The memory 408 may store information within the system 400. In some implementations, the memory 408 may be a computer-readable medium. In alternate implementations, the memory 408 may be a volatile memory unit. In yet some implementations, the memory 408 may be a non-volatile memory unit. The storage 406 may be capable of providing mass storage for the system 400. In some implementations, the storage 406 may be a computer-readable medium. In alternate implementations, the storage 406 may be a floppy disk device, a hard disk device, an optical disk device, a tape device, non-volatile solid state memory, or any other type of storage device. The I/O 402 may be configured to provide input/output operations for the system 400. In some implementations, the input/output device 402 may include a button, a touch screen, a keyboard, etc. In alternate implementations, the input/output device 402 may include a display unit for displaying graphical user interfaces.

In some implementations, the current subject matter relates to a toothbrush apparatus (e.g., similar to the toothbrush system shown in FIGS. 1-3). The toothbrush apparatus may include one or more sensing module(s), sensing element(s), and/or sensor(s) (which may incorporate one or more of the modules above, including but not limited to, the accelerometer 314, timer and/or clock 313, monitoring module 310, computation module 316, examination module 322, secondary processing module 332, transfer module 324, and/or any other modules and/or any combination thereof shown in FIG. 3) configured to perform at least one of the following: detect at least one time period associated with use of the toothbrush apparatus, detect one or more movements of the toothbrush apparatus, and any combination thereof, and one or more processors (e.g., processing modules 306) communicatively coupled to the sensing module(s) and configured to determine one or more measurements based on at least one of: the one or more detected time periods, the one or more detected movements, and any combination thereof of the toothbrush apparatus, and store the one or more determined measurements in one or more memory locations (e.g., memory 308) communicatively coupled to the one or more processors. The toothbrush apparatus may also include one or more feedback modules (e.g., feedback modules or devices 319) configured to receive the stored measurements and encode them into corresponding one or more feedback signals. The apparatus may further include one or more data transfer modules (e.g. data transfer modules/devices 324) configured to transmit one or more feedback signals.

In some implementations, the current subject matter may include one or more of the following optional features. The toothbrush apparatus may also include a brush head (e.g., brush head 202), and a housing including an interchangeable motor module (e.g., module 204, 304), and the feedback modules. The interchangeable motor module may include one or more power modules (e.g. module 320), one or more memories (e.g., memory 308), and the processors (e.g., processing module 306).

In some implementations, the time periods may include at least one of the following: a start time for using the toothbrush apparatus, an end time for using the toothbrush apparatus, a length of time during which the toothbrush apparatus is being used, a number of times the toothbrush apparatus is used, a duration between at least two uses of the toothbrush apparatus, and any combination thereof. In some implementations, the sensing module may include at least one of the following: an accelerometer, a clock, a monitoring module, and any combination thereof. Further, the measurements may be separately determined for each user in a plurality of users of the toothbrush apparatus. Additionally, the measurements may include at least one of the following: a brushing intensity, a brushing pressure, one or more parameters associated with brushing movements, a location of the toothbrush apparatus in a mouth of a user during brushing, a coverage of brushing, and any combination thereof.

In some implementations, the transfer modules may be configured to transmit the one or more to one or more external devices (e.g., devices 326) communicatively coupled to the toothbrush apparatus. The external devices may be configured to decode the feedback signals, and generate, based on the decoded feedback signals, one or more reports indicative of the use of the toothbrush apparatus.

In some implementations, the feedback signals may include at least one of the following: an audio signal, a visual signal, an optical signal, an ultrasound signal, a vibration, and any combination thereof. Further, the feedback signals may correspond to a different time period during which the toothbrush apparatus is used. Also, the feedback signals may correspond to one or more parameters (e.g., speed, intensity, location, positioning, orientation, power consumption, etc.) associated with operation of the toothbrush apparatus.

In some implementations, the measurements may be stored in the memory locations using a predetermined resolution in a compressed format. The measurements may be compared to one or more predetermined usage values. The predetermined usage values may include at least one of the following: a minimum length of time for a brushing, a maximum length of time for a brushing, a minimum length of time between brushings, a maximum length of time between brushings, a desired pressure exerted by bristles of a toothbrush head on the user's teeth and/or gums, a maximum level of motion of the toothbrush apparatus, a minimum level of motion of the toothbrush apparatus, a desired brushing coverage within regions of the user's mouth, a length of time of the toothbrush apparatus at particular regions, and any combination thereof. Further, the feedback signals may be generated based on the comparison of the measurements to the predetermined usage values.

In some implementations, the feedback signals may be generated automatically, at predetermined period of time, or after each use of the toothbrush apparatus. Further, the feedback signals may be generated based on a mode of operation of the toothbrush apparatus. The mode of operation may include at least one of the following: a low mode, a high mode, a soft mode, a whitening mode, a gentle mode, a firm mode, a communications mode, and any combination thereof.

In some implementations, the feedback signals may include one or more audio signals having a predetermined range of frequencies. The frequencies may include layered tone frequencies, where the feedback modules, using the layered tone frequencies, may be configured to encode one or more measurements using a high bitrate. Each frequency in the predetermined range of frequencies may correspond to a predetermined value indicative of predetermined use of toothbrush apparatus.

Figure 5:
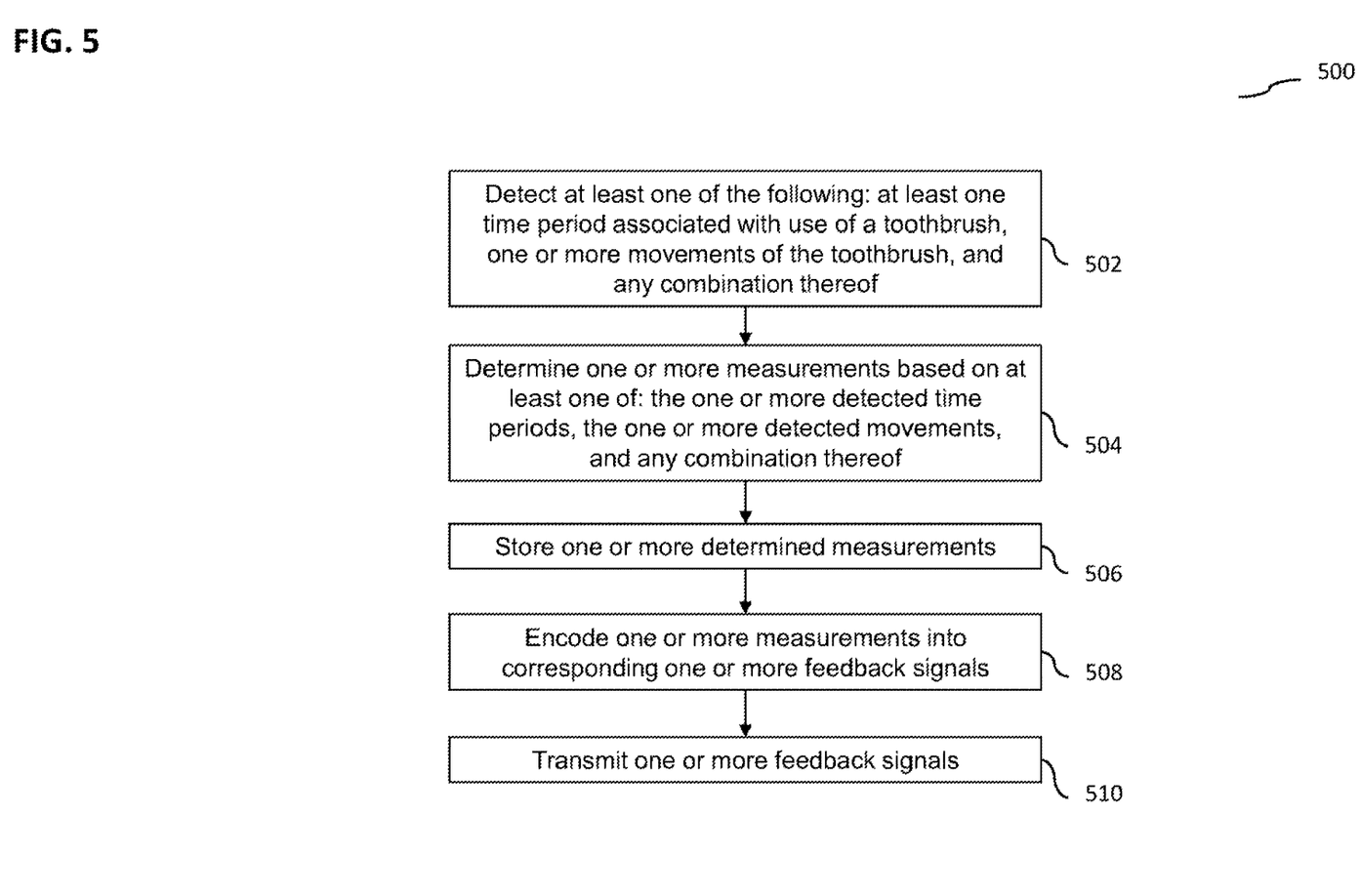
FIG. 5 is an exemplary method, according to some implementations of the current subject matter.

FIG. 5 illustrates an exemplary method 500 for tracking, recording, and generating feedback of use of a toothbrush apparatus according to some implementations of the current subject matter. At 502, at least one time period associated with use of the toothbrush, one or more movements of the toothbrush, and any combination thereof may be detected (e.g., using a sensing module (e.g., an accelerometer 314, a clock 313, monitoring module(s), etc.). At 504, one or more measurements may be determined (e.g., using processing modules 306) based on at least one of: the detected time periods, the detected movements, and any combination thereof, and stored in a memory location (e.g., memory 308).

At 506, the measurements may be encoded into corresponding feedback signals. At 508, the feedback signals may be transmitted (e.g., using transfer modules 324).

In some implementations, the current subject matter may include one or more of optional features discussed above.

In some implementations, the current subject matter relates to a medical system. The system may include a toothbrush apparatus, which may include a sensing module configured to perform at least one of the following: detect at least one time period associated with use of the toothbrush apparatus, detect one or more movements of the toothbrush apparatus, and any combination thereof. The system may also include one or more processors communicatively coupled to the sensing module and configured to determine one or more measurements based on at least one of: the one or more detected time periods, the one or more detected movements, and any combination thereof of the toothbrush apparatus, and store the determined measurements in one or more memory locations communicatively coupled to the processors. The apparatus may further include one or more feedback modules configured to receive the stored measurements and encode the measurements into corresponding one or more feedback signals, and one or more data transfer modules configured to transmit one or more feedback signals. The medical system may further include a decoding module communicatively coupled to the toothbrush apparatus. The decoding module may be configured to receive and decode the feedback signals into one or more values representative of the use of the toothbrush apparatus. The above optional features may also be included in this system.

All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure). Thus, for example, it will be appreciated by those skilled in the art that the block diagrams presented herein represent conceptual views of illustrative system components and/or circuitry embodying the principles of the invention. Similarly, it will be appreciated that any flow charts, flow diagrams and the like represent various processes which may be substantially represented in computer readable storage media and so executed by a computer or processor, whether or not such computer or processor is explicitly shown.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed. It will also be understood that when an element is referred to as being "connected" or "coupled" to another element, it can be directly connected or coupled to the other element or intervening elements may be present.

As stated above, the systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A toothbrush apparatus, comprising:
an accelerometer operable to detect one or more movements indicative of using the toothbrush apparatus;
a clock operable to detect time measurements associated with using the toothbrush apparatus, wherein each time measurement includes a date, a start time of day for using the toothbrush apparatus on the date, and an end time of day for using the toothbrush apparatus on the date;
a system bus in electrical communication with the accelerometer and the clock;
one or more processors in electrical communication with the accelerometer and the clock via the system bus; and
a non-transitory computer-readable storage medium in electrical communication with the one or more processors via the system bus, the non-transitory computer-readable storage medium having stored thereon instructions that, when executed by the one or more processors, cause the one or more processors to
receive the one or more movements detected by the accelerometer,
for the one or more movements detected by the accelerometer, receive the time measurements detected by the clock,
determine one or more measurements based on the the one or more movements and based on the time measurements associated with the one or more movements,
store the one or more measurements in the non-transitory computer-readable storage medium,
transmit the one or more measurements, stored in the non-transitory computer-readable storage medium, to one or more external computing devices in wireless communication with the one or more processors.

2. The toothbrush apparatus according to claim 1, further comprising a housing, a brush head, and a power module, wherein the brush head is releasably securable to the housing, and the power module, the accelerometer, the clock, the one or more processors, and the non-transitory computer-readable storage medium are removably positionable within the housing.

3. The toothbrush apparatus according to claim 1, wherein the one or more measurements include at least one of the following: a brushing intensity, a brushing pressure, one or more parameters associated with brushing movements, a location of the toothbrush apparatus in a mouth of a user during brushing, a coverage of brushing, and any combination thereof.

4. The toothbrush apparatus according to claim 1, wherein the instructions for causing the one or more processors to store the one or more measurements include instructions to cause the one or more processors to store the one or more measurements in one or more memory locations in the non-transitory computer-readable storage medium includes using a predetermined resolution in a compressed format.

5. The toothbrush apparatus according to claim 1, wherein the instructions for causing the one or more processors to transmit the one or more measurements include instructions to cause the one or more processors to transmit the one or more measurements automatically, at predetermined period of time, after each use of the toothbrush apparatus, or a combination thereof.

6. The toothbrush apparatus according to claim 1, wherein the instructions for causing the one or more processors to transmit the one or more measurements include instructions to cause the one or more processors to transmit the one or more measurements based on a mode of operation of the toothbrush apparatus.

7. The toothbrush apparatus according to claim 6, wherein the mode of operation includes at least one of the following: a low mode, a high mode, a soft mode, a whitening mode, a gentle mode, a firm mode, a communications mode, and any combination thereof.

* * * * *